Patented Mar. 9, 1948

2,437,554

UNITED STATES PATENT OFFICE 2,437,554

DYESTUFF PREPARATIONS CONTAINING AN ACID ESTER SALT OF A LEUCO VAT DYESTUFF, A WATER-SOLUBLE ACID AMIDE AND A SALT OF A QUATERNARY AMINO ACID

Roger Ratti, Neu-Allschwil, near Basel, and Philipp Brandt, Basel, Switzerland, assignors to Durand & Huguenin S. A., Basel, Switzerland, a Swiss firm No Drawing. Application November 29, 1943, Serial No. 512,245. In Switzerland May 5, 1941

13 Claims. (Cl. 8—70)

This application is a continuation-in-part to our copending application Ser. No. 441,752, now forfeited filed on May 4, 1942.

See this invention relates to the preparation of dyestuff compositions for printing textile fibres containing ester salts of leuco vat dyestuffs and at least two assistants of two different species having a dispersing action on the ester salts, and more particularly to dyestuff compositions for printing textile fibres containing difficultly soluble ester salts of leuco vat dyestuffs and at least two assistants of two different species having a dispersing action on the ester salts.

Still more particularly it relates to dyestuff compositions containing as assistants having a dispersing action on the ester salts, water-soluble primary to quaternary nitrogenous organic bases which contain at least one solubilising group selected from the class consisting of COOH and $SO_3H$, with the condition that in the molecule one of these acidic groups must form a stable internal salt with a basic group, and further comprising water-soluble acid amides, as hereinafter defined.

Still more particularly it relates to dyestuff compositions containing as assistants having a dispersing action on the ester salts, a stable internal salt of an amino acid selected from the class of betaines and sulfobetaines and also water-soluble acid amides.

Further still more particularly it relates to printing compositions especially adapted for the application of difficultly soluble ester salts of leuco vat dyestuffs and to a process for printing textile fibres with these printing compositions.

The ester salts of leuco vat dyestuffs used in the present invention may be derived from the various series of known vat dyestuffs (for instance from indigoids, thioindigoids and all vat dyestuffs containing the anthraquinone nucleus system and others). Compositions of great value are obtained, when using salts of acid sulfuric acid esters of leuco vat dyestuffs, especially alkali salts which may be obtained in a stable powder form by known methods.

The printing of textile material with ester salts of leuco vat dyestuffs known in the trade as "Indigosols" is a well known art. For this purpose the ester salt is generally dissolved in water and a thickening agent, whereupon the printing paste is applied to the fabrics by known methods and the insoluble vat dyestuff is fixed on the fibre by subsequent hydrolysis and oxidation, while the hydrolysing and oxidising agents may be added to the printing pastes.

It is the sulfuric acid ester group $—SO_3H$ which in general confers the solubility in water on the ester salts of leuco vat dyestuffs. It appears however that this solubility varies widely according to the dyestuff which is to be used. Whilst some of the leuco ester salts are very easily soluble in water, others are considerably less soluble and easily salted out by electrolytes, for instance by the sodium and ammonium salts used as oxidising agents or as acid yielding agents. For this reason, in numerous cases it is necessary to add to the printing colours containing less soluble ester salts of leuco vat dyestuffs or ester salts which are easily salted out, some quantities of organic solvents, such as for instance $\omega,\omega'$-dihydroxy-diethylsulfide, ethyleneglycol, sodium salt of benzyl sulfanilic acid and the like. However, certain vat dyestuffs yield ester salts which are so difficultly soluble in water, that practically it is impossible to use them for printing purposes, even with the assistance of usual solvents. In spite of the excellent properties, which they may have such difficultly soluble ester salts are not put on the market. Of course, many attempts have been made to remedy this inconvenience, but a process giving full satisfaction in every respect has not yet been found.

It is now an object of this invention to produce novel dyestuff compositions and/or printing pastes particularly adapted for the printing of ester salts of leuco vat dyestuffs, especially of difficulty soluble ester salts. Moreover, a further object of this invention consists in producing printing compositions containing the ester salts, especially the difficultly soluble ester salts, in a degree of dispersion optimum for printing.

It is still a further object to provide printing compositions containing the leuco ester salts precipitated in a finely divided form. It is still a further object to produce printing compositions containing the leuco ester salts dissolved in the printing paste. Moreover, a further object of this invention consists in providing printing compositions containing besides a suitable oxidising agent and in some cases also an acid yielding agent, the leuco ester salts in a degree of dispersion optimum for printing. Finally, a still further object of this invention is to provide prints on fabrics distinguished by their evenness, their brilliancy of shades and by a great dyeing power.

These and other objects of the invention are accomplished in a general way by incorporating into a printing paste, directly or by way of first mixing with the ester salt of a leuco vat dyestuff, water-soluble primary to quaternary nitrogenous organic bases containing at least one solubilising group selected from the class consisting of COOH and SO₃H, whereby in the molecule an acidic group forms a stable internal salt with a basic group and further water-soluble acid amides, as hereinafter defined.

By the expression "stable internal salts" there is to be understood that the internal salt is not hydyrolysed in aqueous solution.

The stable salts of the above general definition must contain aliphatic, aromatic, hydroaromatic and mixed aliphatic-aromatic radicals. Anyone of these radicals may again be composed of the different radicals which are linked not only by a direct carbon-carbon linkage, but also by bridges such as for instance O, S, NH—CO, SO₂—NH and the like. Moreover each of these radicals may contain further substituents.

The nitrogen atom of the organic base from which the internal salts are derived may also be a member of a heterocyclic nucleus which, besides this hetero-atom, may contain other heteroatoms.

The internal salts may also be derived from di- and polyamines; in this case such polyamines may contain nitrogen atoms of a different degree of alkylation or arylation. It is not necessary that every basic group present in the molecule forms an internal salt with an acidic group. Furthermore, one molecule may contain more acidic groups than basic groups. In the latter case the acidic groups, which are not neutralised by the internal salt formation, must be neutralised by an appropriate inorganic or organic base. But it is essential that, at all events, at least one basic group should form in the molecule a stable internal salt with an acidic group.

Moreover, if the organic base contains a sulfo group, this latter may also be present in form of an —O—SO₃—H-group.

Typical and most suitable compounds of the above general definition are the betaines and the sulfobetaines. Betaines are the internal salts of ammonium carboxylic acids, whilst sulfobetaines are the corresponding internal salts of ammonium sulfonic acids. These compounds may be obtained according to the following known methods:

(a) A tertiary amine containing a carboxylic or a sulfo group is converted, preferably in form of a salt, into the corresponding ammonium compound by treating the same with a suitable alkylating agent, such as for example methyl chloride or benzyl chloride.

(b) A tertiary amine containing no acidic group is converted into the corresponding ammonium compound by treating the same with an alkylating agent containing a carboxylic or a sulfo group, such as for example monochloroacetic acid, benzylchloride carboxylic acid, chloroethane sulfonic acid, chloroxypropane sulfonic acid, benzylchloride sulfonic acid and the like.

(c) A carboxylic or a sulfo group is introduced in a suitable manner into a suitable quaternary ammonium compound. When using for the introduction of the sulfo group one of the usually employed methods of sulfonation, one or more sulfo groups may be introduced into the ammonium compound, according to the used method of sulfonation and to the activity of the ammonium compound to be sulfonated.

Especially suitable for the purposes of the present invention are the quaternary ammonium compounds containing only acidic groups forming an internal salt. Such compounds are for example the following ones: tetraalkyl-ammonium-betaines and -sulfobetaines, trialkyl-aralkyl-ammonium-betaines, and -sulfobetaines, dialkyl-diaralkyl-ammonium-betaines and -sulfobetaines, betaines and -sulfobetaines which are derived from tetraalkyl-alkylene-diamines or from N-dialkyl-N'-acyl-alkylene-diamines, hydroxyalkyl-aralkyl-ammonium-betaines and -sulfobetaines, trialkyl-aryl-ammonium betaines and -sulfobetaines, dialkyl-aryl-aralkyl-ammonium-betaines and -sulfobetaines and betaines and sulfobetaines derived from heterocyclic ammonium compounds. Also primary to tertiary amino acids may form stable internal salts.

For the purposes of the present invention for example the internal salts of the following amino acids are suitable: amino-alkyl-sulfonic acids, such as taurine and its derivatives, amino-alkyl-sulfuric acids, such as β-aminoethyl-sulfuric acid, the monosulfonic acids derived from dialkyl-aralkyl-amines and alkyl-diaralkyl-amines.

Excellent results are especially obtained with the internal salts containing at least one aralkyl radical, such as for example the benzyl and naphthomethyl radical.

As water-soluble acid amides the water-soluble amides of carboxylic acids and of carbonic acid are particularly suitable. It must be stated, that by the term amide of carbonic acid there are to be understood, besides urea and its water-soluble substitution products, also other water-soluble derivatives of urea or bodies containing the radical of urea, such as for instance urethane, dicyanodiamide, biruet, hydrantoin and their derivatives. Water-soluble acid amides which have been found suitable for the purpose of this invention are for example: formamide, acetamide, chloroacetamide, hydroxyacetamide, diethanoloxamide, tartaric acid amide, benzamide, toluene sulfonic acid amide and the above mentioned amides of carbonic acid.

Instead of water-soluble acid amides there may further be used as assistants in connection with the above cited stable internal salts certain substances containing hydroxy groups, such as furfuryl alcohol, ω:ω'-dihydroxy-diethyl-sulfide and the like.

In certain cases mixtures of compounds containing hydroxy groups and acid amides in combination with water-soluble stable, internal salts of the above characterised species may have an excellent effect.

The internal salts of amino and ammonium acids enumerated above are soluble in water. Their aqueous solutions show a neutral reaction. They have an excellent dissolving action on ester salts, especially on difficultly soluble alkali salts of acid sulfuric acid esters of leuco vat dyestuffs. This fact may perhaps be explainable by the formation of a salt-like or additional compound between the leuco ester and the internal salt of the amino acid, but this explanation is only to be considered as hypothetical. In some cases indeed the solubility of a mixture of an alkali ester salt with an internal salt of an amino acid in water is considerably increased in comparison with the solubility of each component of the mixture.

By adding to solutions of ester salts the usually required assistants for the development (oxidising agents and acid yielding agents), which assistants are generally electrolytes, the ester salts are mostly precipitated from their solutions especially when using difficultly soluble ester salts. In presence of the internal salts mentioned above a precipitation of the ester salts can completely be avoided or the precipitation can be regulated in such a manner, that the ester salts are dispersed in the printing paste in form of very finely divided particles. When besides the internal salts, water-soluble acid amides and/or substances containing hydroxy groups of the kind defined above are employed as second assistants, the quantity of the internal salts necessary in order to prevent a precipitation of the ester salts or to regulate this precipitation in the desirable way, can considerably be reduced.

In many cases the best regulation of the dispersion of the leuco ester salt can only be obtained by using, besides the internal salts, a second assistant as defined above.

By suitable selection of the internal salts and of the second assistants and by a proper dosage of the quantity of these substances to be added to the dyestuff compositions, the degree of dispersion of the various leuco ester salts can be adjusted in such a way that for one ester salt and for the selected application and developing method there may be obtained the best degree of dispersion, giving in printing on textile fibres the best yield in dyeing power, evenness and brilliancy.

According to the present invention, the new dyestuff compositions can quite generally be prepared by mixing ester salts of leuco vat dyestuffs with internal salts of amino and/or ammonium acids and with second assistants of the above defined types. As many of the claimed internal salts and second assistants are solid, non hygroscopic bodies, it is possible to put dry dyestuff compositions on the market, which already contain the necessary assistants. It is evident that the internal salts and the second assistants can also be added, when the printing paste is prepared. It is also possible to mix internal salts with the dry powders of leuco ester salts and to add the required quantities of the second assistants only when the printing paste is prepared.

It must be understood that also mixtures of different internal salts and second assistants of the above described types or mixtures of internal salts and second assistants can be used in combination with the assistants claimed in the U. S. Patent No. 2,302,753 and in our copending application Serial No. 512,246, now Patent No. 2,432,041.

Dyestuff compositions, which contain, besides the leuco ester salts and a stable internal salt of the above defined kind, as second assistant a water-soluble acid amide and/or a substance containing hydroxy groups give in most of the cases prints which show a remarkably higher intensity and a better evenness and brilliancy than prints obtained under the same conditions with a dyestuff composition containing no second assistant.

It is a surprising fact that a dyestuff composition containing, besides the leuco ester salt, $x$ parts of a mixture of assistants represented by $y$ parts of an internal salt and by $z$ parts of a second assistant will give better results than a composition containing only $x$ parts of an internal salt or $x$ parts of a second assistant alone.

This fact is of great practical value, as thus it is possible to considerably reduce the quantity of internal salts used for the preparation of the dyestuff compositions without diminishing the qualities of the printing effects obtained.

We are aware that in U. S. Patent 2,029,351 it has already been proposed to use salts of dibenzyl-sulfanilic acid together with diethylene-glycol as assistants for the application of sulfuric ester salts of leuco vat dyestuffs to textiles. It has been also proposed to use the sodium salt of monobenzylsulfanilic acid (solution salt B) together with $\omega:\omega'$-dihydroxydiethyl-sulfide for the same purpose. However the mono- and the dibenzylsulfanilic acids distinguish themselves from the assistants claimed in the present patent application by the fact that the former cannot form a stable internal salt. Comparative trials have proved that the compounds containing stable internal salt-forming groups, when used simultaneously with water-soluble acid amides and/or substances containing hydroxy groups as assistants for the printing of difficultly soluble ester salts give considerably better results than the salts of monobenzylsulfanilic acid used together with $\omega:\omega'$-dihydroxydiethyl-sulfide (U. S. Patent No. 1,903,175) or the salts of dibenzylsulfanilic acid used together with diethyleneglycol (U. S. Patent No. 2,029,351).

We are further aware that betaines and sulfobetaines together with dispersing agents and with polyvalent alcohols miscible in water have been proposed in the U. S. Patents 1,989,784 and 2,146,646 as assistants for printing unreduced vat dyestuffs and their free leuco compounds. It is a known fact that great differences exist between a vat solution of a vat dyestuff and a solution of an ester salt of a leuco vat dyestuff. It could therefore not be expected that assistants, which are suitable for vat dyestuffs and vat solutions would also be suitable for ester salts of leuco vat dyestuffs.

Moreover, in the German Patent 708,256 betaines and sulfobetaines are proposed as assistants in resist printing pastes under paddings with an ester salt of a leuco vat dyestuff.

It could therefore not be forseen that betaines and sulfobetaines could be successfully employed as assistants enhancing the dispersion and/or the solubility of esters salts of leuco vat dyestuffs.

The present invention will be further described in connection with the following specific examples, in which the parts are by weight and which are given in order to illustrate this invention. The present invention is not limited to these examples. Changes may be made in the selection of the leuco ester salt, of the internal salts of amino acids and/or ammonium acids and of the water-soluble acid amides and/or substances containing hydroxy groups of the species defined above and in their proportions, in the manipulation steps and other conditions without departing from the scope of the appended claims.

*Example 1*

40 parts of the sodium salt of the acid sulfuric acid ester of leuco-2:1-6:5-anthraquinone - diphenyl-thiazol corresponding to 50 per cent of vat dyestuff are mixed with 50 parts of urea and with 50 parts of any one of the following substances:

(a) The sulfobetaine of dimethyl-benzyl-phenyl-ammonium-sulfonic acid or (b) The sulfobetaine of trimethyl-phenyl-ammonium-meta-sulfonic acid or (c) The sulfobetaine of N-methyl-pyridinium-3-sulfonic acid or (d) The sulfobetaine of N-benzyl-pyridinium-3-sulfonic acid or (e) The mono-sodium salt of the sulfobetaine of dimethyl - benzyl - phenyl - ammonium-disulfonic acid or (f) The mono-diethylamine salt of the sulfobetaine of dimethyl-benzyl-phenyl-ammonium-disulfonic acid.

The dyestuff preparations thus obtained are perfectly suitable for the preparation of printing pastes according to the nitrite process, for instance according to the following formula

| | Parts |
|---|---|
| One of the above cited dyestuff preparations | 140 |
| Water | 300 |
| Neutral starch-tragacanth thickening | 500 |
| 30% sodium nitrite solution | 40 |
| 10% sodium carbonate solution | 20 |
| | 1000 |

The dyestuff preparations are dissolved in hot water and in the required amount of thickening. After cooling down, the sodium nitrite solution and the sodium carbonate solution are added, while stirring.

The printing paste thus obtained contains the ester salt of the leuco vat dyestuff precipitated in a very finely divided form.

If a textile fibre, e. g. cotton, is printed with one of these printing colours and if the printed and dried material is developed by passing for 8 seconds at 70° C. through a bath containing 20 ccm. of sulfuric acid 96 per cent per liter, then well rinsed, neutralised and soaped at the boil, very even, deep, bright greenish yellow prints will be obtained.

The prints obtained with dyestuff compositions containing the internal salts (c) to (f) above cited will advantageously be steamed for 4 minutes.

The above mentioned sulfobetaines (a) to (f) may be obtained as follows:

(a) By sulfonation of dimethyl-phenyl-benzyl-ammonium-chloride as described in Example 1 of the German Patent 233,328. The sulfobetaine contains the sulfo group in the benzyl radical.

(b) According to Giovanni Devoto: Gazetta Chimica Italiana, 64, page 371 (1934).

(c) By treatment in an aqueous solution of equal parts of the potassium salt of pyridine-3-sulfonic acid and water with methylchloride in an autoclave at 90° C. until no more methylchloride is absorbed.

(d) 300 g. of the potassium salt of pyridine-3-sulfonic acid dissolved in 300 ccm. water and 195 g. of benzylchloride are vigorously stirred at 60° C. for 18 hours and the solution evaporated to dryness. For purification the sulfobetaine may be recrystallised from alcohol containing 5 per cent of water.

(e) By sulfonation of dimethyl-phenyl-benzyl-ammonium-chloride as described in the second paragraph of Example 1 of the German Patent 233,328. The free acid which can be obtained from the calcium salt contains only one free sulfo group, the other forming an internal salt. By neutralisation with sodium carbonate the mono-sodium salt is obtained. This acid contains one sulfo group in the benzyl radical and the other sulfo group in the phenyl radical.

(f) See under (e). The free acid obtained is neutralised with diethylamine.

*Example 2*

40 parts of the sodium salt of the acid sulfuric acid ester of leuco 2:1–6:5-anthraquinone-diphenylthiazol corresponding to 50 per cent of the vat dyestuff are mixed with 100 parts of urea and with 50 parts of any one of the following substances:

(a) The sulfobetaine of dimethyl-benzyl-phenyl-ammonium-sulfonic acid or (b) The sulfobetaine of trimethyl-phenyl-ammonium-meta-sulfonic acid or (c) Betaine or (d) The sulfobetaine of trimethyl-benzyl-ammonium-sulfonic acid or (e) The sulfobetaine of triethyl-benzyl-ammonium-sulfonic acid or (f) The sulfonic acid of dimethyl-benzyl-amine (Zwitterion) or (g) The sulfonic acid of diethyl-benzyl-amine (Zwitterion).

The dyestuff preparations thus obtained are perfectly suitable for the preparation of printing pastes according to any one of the known steaming processes. The following formula can for instance be employed:

| | Parts |
|---|---|
| One of the above cited dyestuff preparations | 190 |
| Water | 210 |
| Neutral starch-tragacanth thickening | 500 |
| 25% sodium chlorate solution | 50 |
| 50% ammonium sulfocyanide solution | 40 |
| 1% ammonium vanadate solution | 10 |
| | 1000 |

The dyestuff preparations are dissolved by heating and stirring in the required amount of hot water and thickening. The solution thus obtained is then cooled down and the other above mentioned solutions are added thereto.

The printing pastes contain the ester salt in a very finely divided form.

If one of these printing pastes is printed on cotton or on viscose rayon and if the printed samples are dried and steamed for 8 minutes or 2×8 minutes, then rinsed, soaped at the boil, rinsed and dried, very bright, full bodied and even greenish yellow prints are obtained.

The above mentioned betaines and sulfobetaines (a) to (g) may be obtained as follows:

(a) As described in Example 1 under (a).

(b) As described in Example 1 under (b).

(c) By known methods.

(d) By sulfonation of trimethyl-benzyl-ammonium-sulfate with fuming sulfuric acid containing 33% of SO₃, in a manner analogous to that described in Example 1 of the German Patent 233,328.

(e) By sulfonation of triethyl-benzyl-ammonium-sulfate in the manner described sub (d).

(f) By sulfonation of dimethyl-benzyl-amine with fuming sulfuric acid containing 33% of SO₃ at 90° C. for 10 hours and elimination of the excess of sulfuric acid by barium carbonate.

(g) By sulfonation of diethyl-benzyl-amine in the manner indicated sub (f).

*Example 3*

40 parts of the sodium salt of the acid sulfuric acid ester of leuco-dibromo-anthanthrone corresponding to 50 per cent of vat dyestuff are mixed with 100 parts of urea, 20 parts of ω:ω′-dihydroxydiethylsulfide and with either of 50 parts of (a) The sulfobetaine of dimethyl-benzyl-phenyl-ammonium-sulfonic acid or (b) Betaine or (c) The sulfobetaine of N-benzyl-pyridinium-sulfonic acid.

The dyestuff preparations thus obtained are particularly suitable for the preparation of printing pastes according to any one of the steaming processes.

Very good printing results can for instance be obtained by using the following formula:

| | Parts |
|---|---|
| One of the above cited dyestuff preparations | 210 |
| Water | 190 |
| Neutral starch-tragacanth thickening | 500 |
| 25% sodium chlorate solution | 40 |
| 50% ammonium sulfocyanide solution | 30 |
| 1% ammonium vanadate solution | 20 |
| 22% ammonia | 10 |
| | 1000 |

The printing pastes are made up as indicated in Example 2.

If a dyestuff composition containing the internal salts cited under (a) and (b) is employed for the preparation of the printing colour, the ester salt is precipitated in this colour in a very finely dispersed form, while, on the other hand, the ester salt remains in solution in the printing colour, if a dyestuff preparation containing the internal salt cited under (c) is employed. The prints obtained on cotton or viscose rayon with any of these colours and treated in the manner described in Example 2 show very brilliant, deep and even orange shades.

The above mentioned internal salts (a) to (c) may be obtained as follows:

(a) Cf. Example 1a.

(b) By generally known methods.

(c) By sulfonation of N-benzyl-pyridinium-sulfate with fuming sulfuric acid containing 68% of $SO_3$ at 90° C. in a manner analogous to Example 1 of the German Patent 233,328. The sulfobetaine being very easily soluble in water must be isolated by evaporating the solution to dryness.

The sulfobetaine contains the sulfo group in the benzyl radical.

*Example 4*

40 parts of the sodium salt of the acid sulfuric acid ester of leuco-2:1-6:5-anthraquinone-diphenyl-thiazol corresponding to 50 per cent of vat dyestuff are mixed with 50 parts of the sulfobetaine of dimethyl-benzyl-phenyl-ammonium-sulfonic acid and 50 parts of $\omega:\omega'$-dihydroxydiethylsulfide. The prepartion thus obtained gives very good printing results, when employed according to any one of the known steaming processes, e. g. according to the following formula:

| | Parts |
|---|---|
| The above cited mixture | 140 |
| Water | 260 |
| Neutral starch-tragacanth thickening | 500 |
| 25% sodium chlorate solution | 40 |
| 33% ammonium sulfate solution | 40 |
| 1% ammonium vanadate solution | 20 |
| | 1000 |

The printing colour is made up as indicated in Example 2. The ester salt is dispersed in this printing paste in a very finely divided form.

By printing on cotton, drying and steaming for 4 minutes in a continuous steamer, then soaping at the boil the printed samples, a very bright, deep and even greenish yellow will be obtained.

The above mentioned sulfobetaine may be prepared as indicated in Example 1 (cf. Example 1 sub(a)).

*Example 5*

40 parts of the sodium salt of the acid sulfuric acid ester of leuco dibromo-anthanthrone corresponding to 50% of vat dyestuff are mixed with 100 parts of urea and with 50 parts of any one of the following substances:

(a) The sulfobetaine of dimethyl-benzyl-phenyl-ammonium-sulfonic acid or (b) The sulfobetaine of triethyl-benzyl-ammonium-sulfonic acid or (c) Pyridine betaine or (d) The sulfobetaine of N-benzyl-pyridinium-3-sulfonic acid or (e) The sulfonic acid of diethyl-benzyl-amine (Zwitterion).

Very good results are obtained, if the above cited dyestuff compositions are used for the preparation of printing colours according to the nitrite-developing process. For instance the following formula is very useful:

| | Parts |
|---|---|
| One of the above cited dyestuff compositions | 190 |
| Water | 270 |
| Neutral starch tragacanth thickening | 500 |
| 30% sodium nitrite solution | 30 |
| 22% ammonia | 10 |
| | 1000 |

The printing paste is made up as described in Example 1. Very brilliant, deep and even orange prints are obtained with these printing colours, if the printed and dried material is developed as indicated in Example 1. Samples which are printed with a printing paste containing the internal salts (b) to (e) are advantageously steamed for 4 minutes before development.

The above cited internal salts may be prepared as follows:

(a) Cf. Example 1 sub(a).

(b) Cf. Example 2 sub (e).

(c) By addition of monochloroacetic acid to dry pyridine, according to von Gerichten, Berichte 15, page 1251. The chlorohydrate may be transformed into the free betaine by treating the same with concentrated sulfuric acid, evaporating the hydrochloric acid and eliminating the —$SO_4$ ions by addition of barium carbonate.

(d) Cf. Example 1 sub(d).

(e) Cf. Example 2 sub(g).

*Example 6*

40 parts of the sodium salt of the acid sulfuric acid ester of leuco dibromo-anthanthrone corresponding to 50 per cent of vat dyestuff are mixed with 50 parts of the sulfobetaine of dimethyl-benzyl-phenyl-ammonium-sulfonic acid and with 70 parts of $\omega:\omega'$-dihydroxydiethylsulfide.

The dyestuff preparation thus obtained can advantageously be used for the preparation of printing pastes according to the aluminium-chlorate process. The following formula gives very good results:

| | Parts |
|---|---|
| The above cited dyestuff composition | 160 |
| Water | 130 |
| Neutral starch tragacanth thickening | 500 |
| 10% tartaric acid solution | 70 |
| 25% aluminium chlorate solution | 120 |
| 10% tin chloride solution, the solution being partially neutralised with sodium carbonate | 20 |
| | 1000 |

The dyestuff preparation is completely dissolved in water and thickening. The solution is then cooled down. By adding the aluminium chlorate solution the ester salt precipitates in a very finely divided form.

Cotton or viscose rayon, previously padded in the following padding bath, is now overprinted with this printing colour.

*Padding bath.*—1 gr. of ammonium vanadate is dissolved in 200 ccm. of boiling water, then 5 gr. of tartaric acid dissolved in 200 ccm. of boiling water and 50 gr. of ω:ω'-di-hydroxydiethylsulfide are added. The solution is completed to 1 liter by means of water.

The printed material is dried and hanged up for 24 hours in a room having a temperature of 20°–25° C., during which time the dyestuff will be developed.

A bright, deep and even orange print is thus obtained.

The above mentioned sulfobetaine may be prepared as indicated in Example 1 sub (a).

*Example 7*

40 parts of the sodium salt of the acid sulfuric acid ester of leuco-2:1-naphththioindigo corresponding to 50 per cent of vat dyestuff are mixed with 100 parts of urea, 20 parts of sodium sulforicinoleate and with 50 parts of any one of the following substances:

(a) The sulfobetaine of trimethyl-benzyl-ammonium-sulfonic acid or (b) The sulfobetaine of dimethyl-benzyl-phenyl-ammonium-sulfonic acid or (c) Pyridine betaine or (d) The sulfobentaine of N-methyl-pyridinium-3-sulfonic acid.

The dyestuff preparations containing the internal salts (a) to (d) are especially suitable for the preparation of printing colours according to any one of the steaming processes. The following formula gives, for instance, very good results:

| | Parts |
|---|---|
| One of the above cited dyestuff compositions | 210 |
| Water | 200 |
| Neutral starch-tragacanth thickening | 500 |
| 25% sodium chlorate solution | 40 |
| 50% ammonium sulfocyanide solution | 30 |
| 1% ammonium vanadate solution | 10 |
| 22% ammonia | 10 |
| | 1000 |

The printing pastes are made up in the manner described in Example 2. They contain the ester salt dispersed in a very finely divided form.

By printing on cotton or viscose rayon, drying and developing the prints as indicated in Example 2, very even, full bodied and bright brown shades are obtained.

The above mentioned sulfobetaines and betaines may be obtained as follows:

(a) As described in Example 2 under (d).

(b) As described in Example 1 under (a).

(c) As described in Example 5 under (c).

(d) As described in Example 1 under (d).

*Example 8*

40 parts of the sodium salt of the acid sulfuric acid ester of leuco-2:1-naphththioindigo corresponding to 50 per cent of vat dyestuff are mixed with 60 parts of urea and 20 parts of the sodium salt of sulforicinolic acid and with 30 parts of any one of the following substances:

(a) The sulfobetaine of N-benzyl-pyridinium-sulfonic acid or (b) The sulfobetaine of trimethyl-phenyl-ammonium-p-sulfonic acid or (c) The sulfobetaine of trimethyl-phenyl-ammonium-m-sulfonic acid.

The dyestuff compositions thus obtained are perfectly suitable for the preparation of printing colours according to a known steaming process. The formula given in Example 7 may for example be employed.

The printing colours made up with all of these dyestuff compositions give, when printed on cotton and when the printed material is developed as described in Example 2, bright, deep and even brown shades.

The sulfobetaines mentioned in this example under (a) to (c) may be prepared as follows:

(a) As described in Example 3 under (c)

(b) According to Griess, Berichte 12, page 2116, and Kuhn, Berichte 70, page 1340, (c) As described in Example 1 under (b).

*Example 9*

40 parts of the sodium salt of the acid sulfuric acid ester of leuco-6:6'-dichloro-4:4'-dimethyl-thioindigo corresponding to 50 per cent of vat dyestuff are mixed with 40 parts of urea and with 20 parts of either (a) The sulfobetaine of N-bentzyl-pyridinium-sulfonic acid or (b) The sulfobetaine of dimethyl-benzyl-phenylammonium-sulfonic acid.

The dyestuff preparations thus obtained can successfully be employed for the preparation of printing colours according to any one of the known steaming processes.

Very good results are for instance obtained with the following formula:

| | Parts |
|---|---|
| One of the above cited dyestuff-preparations | 100 |
| Water | 300 |
| Neutral starch-tragacanth thickening | 500 |
| 25% sodium chlorate solution | 40 |
| 50% ammonium sulfocyanide solution | 40 |
| 1% ammonium vanadate solution | 20 |
| | 1000 |

The printing colours are prepared as indicated in Example 2. They contain the ester salt dispersed in a very finely divided form.

If cotton or viscose rayon printed with a printing paste containing one of the dyestuff preparations mentioned in this example are steamed for 2×8 minutes, then rinsed, soaped at the boil, rinsed and dried, very deep and brilliant pink shades are obtained.

The above mentioned sulfobetaines may be obtained as follows:

(a) As described in Example 3 under (c).

(b) As described in Example 1 under (a).

*Example 10*

40 parts of the sodium salt of the acid sulfuric acid ester salt of leuco 6:6'-dichloro-4:4'-dimethylthioindigo corresponding to 50 per cent vat dyestuff are mixed with 50 parts of the sulfobetaine of N-benzyl-pyridinium-sulfonic acid and with 100 parts of acetamide.

This dyestuff preparation can very advantageously be used for the preparation of a printing colour according to the nitrite-developing process, by using for instance the following formula:

| | Parts |
|---|---|
| The dyestuff preparation above cited | 190 |
| Water | 210 |
| Neutral starch-tragacanth thickening | 500 |
| 10% sodium carbonate solution | 20 |
| 30% sodium nitrate solution | 80 |
| | 1000 |

The printing paste thus obtained contains the ester salt dispersed in a very finely divided form.

If this colour is printed and developed as described in Example 1, very brilliant and intense pink shades are obtained.

The sulfobetaine of N-benzyl-pyridinium-sulfonic-acid may be prepared as described in Example 3 (sub (c)).

What we claim is:

1. A dyestuff composition for printing textile fibers comprising a water-soluble acid amide, an ester salt of a leuco vat dyestuff and a water-soluble, stable internal salt of a tertiary to quaternary amino acid selected from the class consisting of betaines which contain an aralkyl radical and sulfobetaines which contain an aralkyl radical.

2. A dyestuff composition for printing textile fibers comprising a water-soluble acid amide, an ester salt of a leuco vat dyestuff and a water-soluble, stable internal salt of a tertiary to quaternary betaine which contains a benzyl radical.

3. A dyestuff composition for printing textile fibers comprising a water-soluble carboxylic acid amide, an ester salt of a leuco vat dyestuff and a water-soluble, stable internal salt of a tertiary to quaternary betaine which contains a benzyl radical.

4. A dyestuff composition for printing textile fibers comprising a water-soluble carbonic acid amide, an ester salt of a leuco vat dyestuff and a water-soluble, stable internal salt of a tertiary to quaternary butaine which contains a benzyl radical.

5. A dyestuff composition for printing textile fibers comprising a water-soluble urea, an ester salt of a leuco vat dyestuff and a water-soluble, stable internal salt of a tertiary to quaternary betaine which contains a benzyl radical.

6. A dyestuff composition for printing textile fibers, comprising a water-soluble acid amide, an ester salt of a leuco vat dyestuff, and the sulfobetaine of dimethyl-phenyl-benzyl-ammonium sulfonic acid containing the sulfo group in the benzyl radical.

7. A dyestuff composition for printing textile fibers, comprising urea, an ester salt of a leuco vat dyestuff, and the sulfobetaine of dimethyl-phenyl-benzyl-ammonium sulfonic acid containing the sulfo group in the benzyl radical.

8. A dyestuff composition for printing textile fibers, comprising acetamide, an ester salt of a leuco vat dyestuff, and the sulfobetaine of N-benzyl pyridinium sulfonic acid containing the sulfo group in the benzyl radical.

9. A dyestuff composition for printing textile fibers, comprising urea, an ester salt of a leuco vat dyestuff, and the sulfonic acid of diethyl benzyl amine containing the sulfo group in the benzyl radical.

10. A dyestuff composition for printing textile fibers comprising a water-soluble acid amide, an ester salt of a leuco vat dyestuff and a water-soluble, stable internal salt of a tertiary to quaternary sulfobetaine which contains a benzyl radical.

11. A dyestuff composition for printing textile fibers comprising a water-soluble carboxylic acid amide, an ester salt of a leuco vat dyestuff and a water-soluble, stable internal salt of a tertiary to quaternary sulfobetaine which contains a benzyl radical.

12. A dyestuff composition for printing textile fibers comprising a water-soluble carbonic acid amide, an ester salt of a leuco vat dyestuff and a water-soluble, stable internal salt of a tertiary to quarternary sulfobetaine which contains a benzyl radical.

13. A dyestuff composition for printing textile fibers comprising a water-soluble urea, an ester salt of a leuco vat dyestuff and a water-soluble, stable internal salt of a tertiary to quaternary sulfobetaine which contains a benzyl radical.

ROGER RATTI.
PHILIPP BRANDT.

REFERENCES CITED

The following references are of record in the file of this patent:

UNITED STATES PATENTS

| Number | Name | Date |
|---|---|---|
| 1,989,784 | Berthold | Feb. 5, 1935 |
| 2,029,351 | Wormald | Feb. 4, 1936 |
| 2,081,017 | Nusslein | May 18, 1937 |
| 2,122,113 | Ratti | June 28, 1938 |
| 2,123,740 | Murphy | July 12, 1938 |
| 2,146,646 | Nusslein | Feb. 7, 1939 |
| 2,193,749 | Tschan | Mar. 12, 1940 |
| 2,206,249 | Doimler | July 2, 1940 |
| 2,211,126 | Kern | Aug. 13, 1940 |
| 2,217,846 | Orthner | Oct. 15, 1940 |
| 2,224,280 | Verity | Dec. 10, 1940 |
| 2,302,753 | Duport | Nov. 26, 1942 |

FOREIGN PATENTS

| Number | Country | Date |
|---|---|---|
| 479,847 | Great Britain | Feb. 10, 1938 |